Oct. 31, 1972    P. B. SHUTT ET AL    3,701,567
COMBINATION PROPORTIONING AND BYPASS VALVE
Original Filed June 11, 1969

PAUL B. SHUTT
CHARLES M. BARNES
INVENTORS

BY
Ken C. Decker
ATTORNEYS

United States Patent Office 3,701,567
Patented Oct. 31, 1972

3,701,567
COMBINATION PROPORTIONING AND BYPASS VALVE
Paul B. Shutt and Charles M. Barnes, St. Joseph, Mich., assignors to The Bendix Corporation
Original application June 11, 1969, Ser. No. 832,162. Divided and this application Oct. 22, 1970, Ser. No. 82,924
Int. Cl. B60t 8/26, 11/34
U.S. Cl. 303—6 C
2 Claims

ABSTRACT OF THE DISCLOSURE

A flow control valve for use in a braking system to systematically proportion hydraulic fluid to the front and rear brakes of the braking system. The flow control valve will correspondingly decrease the hydraulic fluid to the rear brakes with a shift in the center of gravity of the vehicle during a rapid deceleration. With a failure in the front brake supply, the flow control valve permits unobstructed hydraulic fluid flow to provide maximum braking capability in the rear brakes.

BACKGROUND OF THE INVENTION

This application is a division of U.S. application Ser. No. 832,162, now U.S. Pat. No. 3,556,607.

This invention relates to a proportioning valve for use with a vehicular braking system.

As is well known to those skilled in the brake art, during deceleration of a vehicle, a substantial portion of the vehicle's weight is transferred from the rear wheels to the front wheels due to rotation of the vehicle about its center of mass. Therefore, the front wheel brakes perform a substantially greater proportion of the braking effort than do the brakes on the rear wheels. For this reason, the wheel cylinders and other components of the front wheel brakes are sized to reflect this difference in braking effort. While this difference in size is sufficient to overcome the effect of the weight transfer during light braking or ordinary stopping, it is insufficient to compensate for the extremely rapid weight transfer during a rapid deceleration. For this reason, it is necessary to incorporate a proportioning valve in the rear braking system to decrease the hydraulic pressure applied to the rear brakes during a rapid deceleration. While the problem is particularly acute in vehicles employing disc brakes on the front wheels and drum brakes on the rear wheels, and therefore, proportioning valves are most often used on vehicles having this type of braking system, the problem exists on vehicles having drum brakes or disc brakes on all four wheels.

However, if the front wheel braking system should fail, it is necessary to stop the vehicle using the rear brakes alone. Since the proportioning valve in the rear brake system substantially reduces the braking effort of the rear brakes, it is desirable that the effect of the proportioning valve be eliminated from the system so that maximum braking effort may be obtained from the rear wheel brakes when they alone are used to stop the vehicle. To perform this function, a device actuated by a pressure differential between the front and rear braking systems is necessary to enable fluid pressure in the rear braking system to bypass the proportioning valve upon a failure of the front brakes.

SUMMARY OF THE INVENTION

It is an important object of my present invention to provide a proportioning valve which is sensitive to a pressure differential between the front and rear braking systems to render the proportioning valve ineffective upon a failure in the front brakes to permit fluid pressure in the rear system to communicate directly with the wheel cylinders in the rear brakes.

Another important object of my invention is to provide a device that negates the effect of the proportioning valve during a failure in the front braking system, but which resets itself automatically upon repair of the system to reestablish the proportioning effect.

Yet another important object of my invention is to provide a proportioning valve, a mechanism to bypass the proportioning valve, and a warning switch to indicate a failure in the braking system in a single housing.

DETAILED DESCRIPTION

Figures 1, 2:
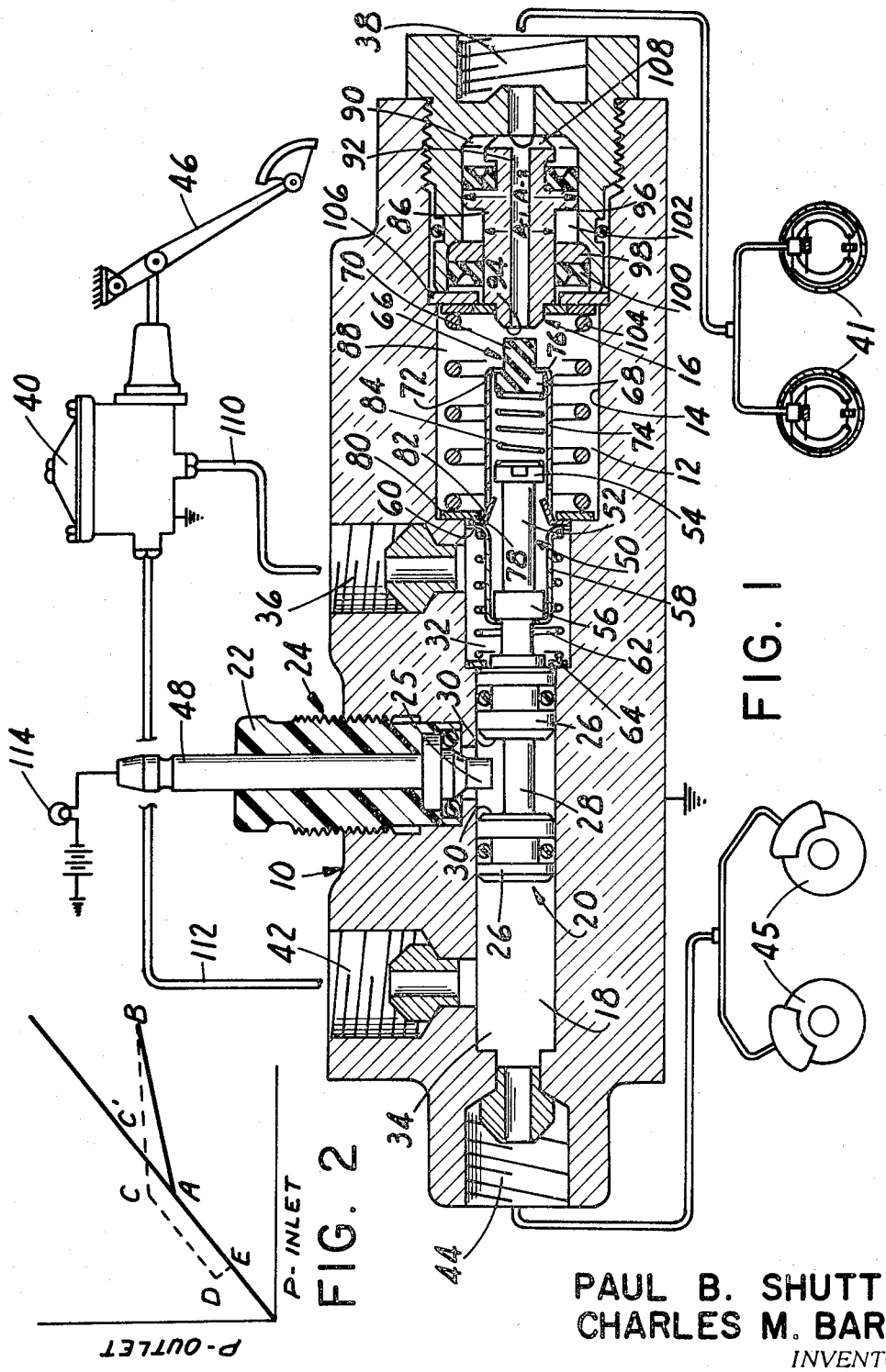
FIG. 1 is a longitudinal cross sectional view of a warning switch and a proportioning valve made pursuant to the teachings of my present invention.
FIG. 2 is a graphical representation of the operation of the device illustrated in FIG. 1.

Referring now to the drawing, a housing 10 defines a bore 12 having a larger diameter portion 14 containing a proportioning valve generally indicated at 16 and a smaller diameter portion 18 in which a piston 20 reciprocates. A warning switch housing 22 is carried by the housing 10 and contains a warning switch 24 of a type well known to those skilled in the art that actuates a warning device 114 when the piston 20 is shifted into contact with a switch arm 25 that projects into the bore 12. The piston 20 has a pair of opposed faces 26 interconnected by a web 28 spaced from the walls of the bore 18 to present a pair of shoulders 30 between the web 28 and each of the faces 26. First and second chambers 32 and 34 are defined in the bore 14 by the respective faces 26 and corresponding ends of the bore. An inlet 36 and an outlet 38 are connected to a first hydraulic system 110 to communicate the chamber 32 with one side of a split system master cylinder 40 and with the rear brakes 41. An inlet 42 and an outlet 44 are connected to a second hydraulic system 112 to communicate the chamber 34 with the other side of the master cylinder 40 and with the front brakes 45. Fluid pressure is developed in the master cylinder 40 by a pedal 46 located in the operator's compartment of the vehicle. A contact 48 extends from the housing 22 and is connected to an electrical circuit that actuates a warning signal 114 upon actuation of the warning switch 24.

A plunger 50 is secured to the piston 20 and extends through the chamber 32 into the larger diameter portion 14 of the bore 12. Plunger 50 includes a stem 52, a head 54 and an enlarged portion 56. A cage 58 engages the enlarged portion 56 and extends coaxially with the plunger 50 terminating in a flange portion 60. A spring 62 engages one side of a retainer ring 64 which is engaged on its other side by the piston 20. Cage 58, spring 62 and retainer ring 64 cooperate with each other to center the piston 20 in the bore when equal pressure acts on each of the faces 26, thereby preventing the piston 20 from inadvertently actuating the switch 24.

The construction of the proportioning valve 16 will now be described. An annular, resilient valve seat 66 has a larger diameter portion 68 and a smaller diameter portion 70 with a shoulder 72 therebetween. Valve seat 66 is reciprocable in the bore 14 and is carried by a sleeve 74 having a radially inwardly projecting flange portion 76 on one end thereof that engages the shoulder 72 to limit movement of the seat 66. A radially outwardly projecting flange 78 is formed on the other end of the sleeve 74 and abuttingly engages a retainer ring 80 mounted in the bore 14. A pair of inwardly extending arms 82 are provided on the sleeve 74 and are adapted to engage the head 54 during movement of the plunger toward the other end of the sleeve 74. Coupling means or arms 82 permit relative movement between the plunger 50 and sleeve 74 during movement of the plunger toward the seat 60 and during movement of the plunger toward the other end until the arms 82 engage the head 54, whereupon the plunger 50 and sleeve 74 move together as a unit. A spring 84 is interposed between the head 54 and the valve seat 66 to yieldably maintain the latter in engagement with the flange 76 and, assisted by the spring 62 and cage 58, to yieldably bias the flange 78 into engagement with the ring 80.

Valve 16 further includes a valve piston 86 that cooperates with the valve seat 66 to divide the large diameter bore 14 into an inlet chamber 88 and an outlet chamber 90. The piston 86 as a central bore 92 to permit fluid communication between the inlet and outlet chambers when the piston is disposed in the bore such that an annular sealing area 94 on one end of the piston does not abut the valve seat 66. A radially projecting, circumferentially extending shoulder 96 extends from the piston 86 and is adapted to engage a stop ring 98 mounted in the bore 14 to limit the travel of the piston 86. Appropriate seals 100 are provided to prevent fluid from leaking into a cavity 102. A spring 104 is interposed between the ring 80 and a washer 106 force-fitted on the one end of the piston 86 to yieldably maintain the other end 108 of the piston 86 into engagement with the wall of the housing 10.

MODE OF OPERATION

Assuming normal operation of the brakes, the operator depresses the pedal 46 to build up pressure in the master cylinder 40 to pressurize the chambers 32 and 34. Unless a failure occurs in one of the hydraulic systems 110 or 112, pressure in chamber 32 will equal the pressure in chamber 34, thereby maintaining the piston 20 centered with respect to the warning switch 24.

FIG. 1 illustrates the brake release position of the various parts of the proportioning valve 16. Fluid enters the inlet chamber 88, flows through the bore 92 to the outlet chamber 90 and through the outlet port 38 to the rear wheels 41. Initially, fluid pressure in chamber 88 equals the pressure in chamber 90. However, since fluid pressure in chamber 90 acts across the entire area $A_2$ and the pressure in chamber 88 acts against the much smaller area $A_1$, an imbalance of forces acts on the piston 86 although the fluid pressure in the chambers 88 and 90 is equal. When this force imbalance exceeds the force of the spring 104, the piston 86 moves to the left viewing FIG. 1 until the annular area 94 sealingly engages valve seat 66 to close fluid communication between the inlet and outlet chambers 88 and 90, through the central bore 92. This point is represented by A in FIG. 2.

After the initial closing of the valve, a pressure increase in the inlet chamber 88 will partially reopen the valve to admit more fluid to the outlet chamber 90. However, due to the differential area $A_2$ over $A_1$, only a fraction of the pressure increase in the chamber 88 will occur in the chamber 90 before the valve 16 recloses. Thus a lower pressure lever is established in the chamber 90 than exists in the chamber 88. This proportioning effect of the valve is represented by line A-B on FIG. 2.

Point B represents the state where the vehicle operator reduces pressure on the pedal 46 to cause a decrease of fluid pressure in the inlet chamber 88. A force imbalance is thus established on the piston 56, forcing the latter and the valve seat 66 to the left viewing FIG. 1 to compress the springs 84 and 104. As the piston 86 and seat 66 move into the inlet chamber 88, the volume of the outlet chamber 90 increases, thereby reducing the fluid pressure therein. This action of the valve is represented by line B-C on FIG. 1.

As further reductions of inlet pressure and the subsequent expansion of the outlet chamber 90 occur, a state will be reached in which the pressure in the outlet chamber 90 equals the pressure in the inlet chamber 88, represented by C' in FIG. 2. Also, at some point during the expansion cycle represented by line A-C on FIG. 1, the force due to fluid pressure acting on the area $A_2$ will equal the force due to fluid pressure acting on the area $A_1$ plus the force of the spring 104. Preferably, spring 104 is sized so that the forces balance at the same time that the pressures in chambers 88 and 90 equalize, as represented by C' on FIG. 2. At this time the piston 86 and seat 66 discontinue their movement into the chamber 88. Further reductions of inlet pressure will cause the pressure in chamber 88 to drop below the pressure in chamber 90. When the force created by this pressure differential acting on the small diameter portion 70 of seat 66 is great enough to overcome the force of the spring 84, valve seat 66 lifts off the sealing surface 94, permitting fluid communication between the chambers 88 and 90 through the bore 92, as represented by line C-D on FIG. 1. When the force due to fluid pressure acting on area $A_2$ is reduced still further to a value below the force of the spring 104, the piston will be returned to its initial position as seen in FIG. 1, thus fully opening the valve 16, as represented by E in FIG. 2.

During the braking cycle as described above, pressure in the chamber 34 is equal to the pressure in chamber 32; thus the piston 20 remains in the position illustrated in FIG. 1 due to the effect of the spring 62, cage 58 and plunger 50. However, should a malfunction occur in the front brake hydraulic system 110, pressure in chamber 34 would decrease. The higher pressure in chamber 32 acting on the piston 20 shifts the latter to the left viewing FIG. 1. The shoulder 30 then engages the switch arm 25 connecting the latter with the grounded housing 10 to complete a circuit actuating a warning device 114 in a manner well known to those skilled in the art.

Shifting of the piston 20 also engages the head 54 of plunger 50 with the arms 82 and therefore forces sleeve 74, seat 66 and spring 84 to the left viewing FIG. 1 against the bias of the spring 62. Simultaneously, increasing pressure in the chambers 88 and 90 shifts the piston 86 to the left as described above. However, the piston 86 cannot engage the valve seat 66 since the latter has been carried to the left viewing FIG. 1 by the piston 20 and the engagement of the shoulder 96 with the stop ring 98 prevents the piston 86 from following the seat 66. Fluid communication between the chambers 88 and 90 through the central bore 92 is therefore permitted regardless of the pressure level in the respective chambers. Thus, the proportioning function of the valve 16 is eliminated during a failure in the front brake hydraulic system to permit the rear brakes to deliver their maximum braking effort. After the system is repaired, the first normal brake application will recenter the piston 20, returning the valve seat to the position illustrated in FIG. 1, thus resuming rear brake proportioning.

We claim:
1. A flow control valve comprising:
   a housing having an internal bore therein with an inlet port in communication with a source of pressurizable fluid and an outlet port;
   piston means for dividing said internal bore into an inlet chamber and an outlet chamber, said piston means having a central bore to communicate pressurizable fluid from the inlet chamber to the outlet chamber, said piston means having a first surface area located in said outlet chamber and a second surface area located in said inlet chamber, said first surface area being larger than said second surface area;
   stop means located in said inlet chamber having an annular sleeve, said annular sleeve having a radially inwardly projecting flange on one end thereof;

seat means located in said annular sleeve having a large diameter portion separated from a small diameter portion by a shoulder, said small diameter portion extending through said flange;

first resilient means located in said annular sleeve for biasing the shoulder of said seat means into engagement with the flange; and second resilient means located in said internal bore for yieldably biasing said piston means toward said outlet chamber, said pressurized fluid acting on said first surface area and said second surface area to develop a pressure differential force across said piston means, said pressure differential force overcoming said second resilient means permitting said piston means to move until said small diameter portion of the seat means restricts the fluid flow through said central bore during periods of increasing pressurization of fluid through said inlet port and thereby establish a lower pressure in said outlet chamber than in said inlet chamber, said seat means and said first resilient means acting as a check valve during periods of decreasing pressurization of fluid received through said inlet port to permit unrestricted fluid communication from the inlet chamber to the outlet chamber through the central bore when the fluid pressure in the outlet chamber exceeds the pressure in the inlet chamber sufficiently to overcome said first resilient means and move the small diameter portion of the seat means away from said central bore.

2. The flow control valve, as recited in claim 1, wherein movement of the first piston means toward said first chamber in response to a pressure differential between said first and second chambers causes a corresponding movement of said seat means and stop means to permit unrestricted flow through the central bore into the outlet chamber.

References Cited
UNITED STATES PATENTS

| | | | |
|---|---|---|---|
| 3,211,175 | 10/1965 | Replogle | 137—508 X |
| 2,991,797 | 7/1961 | Baldwin | 137—508 X |
| 3,245,221 | 4/1966 | James et al. | 303—6 C X |
| 3,517,970 | 6/1970 | Cripe | 303—6 C |

MILTON BUCHLER, Primary Examiner

J. J. McLAUGHLIN, Assistant Examiner

U.S. Cl. X.R.

137—505.25; 188—349